(12) United States Patent
Ikeda et al.

(10) Patent No.: US 12,459,772 B2
(45) Date of Patent: Nov. 4, 2025

(54) RECORDING APPARATUS AND PAPER FEEDING METHOD

(71) Applicant: CANON KABUSHIKI KAISHA, Tokyo (JP)

(72) Inventors: Yuki Ikeda, Kanagawa (JP); Ryo Harigae, Tokyo (JP); Hikaru Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 18/318,600

(22) Filed: May 16, 2023

(65) Prior Publication Data

US 2023/0379419 A1 Nov. 23, 2023

(30) Foreign Application Priority Data

May 20, 2022 (JP) .................................. 2022-083183

(51) Int. Cl.
| | |
|---|---|
| *B65H 23/32* | (2006.01) |
| *B65H 9/20* | (2006.01) |
| *B65H 20/04* | (2006.01) |
| *B65H 20/40* | (2006.01) |
| *B65H 26/06* | (2006.01) |
| *B65H 49/26* | (2006.01) |
| *H04N 1/00* | (2006.01) |
| *H04N 1/12* | (2006.01) |

(52) U.S. Cl.
CPC ............... *B65H 23/32* (2013.01); *B65H 9/20* (2013.01); *B65H 20/04* (2013.01); *B65H 20/40* (2013.01); *B65H 26/06* (2013.01); *B65H 49/26* (2013.01); *H04N 1/00575* (2013.01); *H04N 1/1215* (2013.01); *H04N 1/1225* (2013.01); *H04N 1/123* (2013.01); *B65H 2301/34112* (2013.01); *B65H 2301/41* (2013.01); *B65H 2601/326* (2013.01); *B65H 2701/1311* (2013.01)

(58) Field of Classification Search
CPC ...... B65H 20/00–20/40; B65H 16/00–16/106; B65H 23/182–23/198; B65H 23/32
See application file for complete search history.

(56) References Cited

U.S. PATENT DOCUMENTS

| | | | |
|---|---|---|---|
| 10,807,822 B2 * | 10/2020 | Yamaya ................. | B65H 19/10 |
| 2021/0284476 A1 * | 9/2021 | Harigae ................. | B65H 23/16 |

FOREIGN PATENT DOCUMENTS

JP 2021-143074 A 9/2021

* cited by examiner

*Primary Examiner* — Jeremy R Severson
(74) *Attorney, Agent, or Firm* — Canon U.S.A., Inc. IP Division

(57) ABSTRACT

A recording apparatus having a support portion that supports a roll having a wound sheet, a drive portion, a conveying passage, a conveyer, and a recording portion. The drive portion rotates the supported roll in a first direction to feed the sheet from the roll, and rotates the roll in a second direction to rewind the sheet onto the roll. The conveying passage guides the sheet fed from the roll in a feeding direction and has first and second positions upstream of the conveyer in the feeding direction. The drive portion performs, before the sheet reaches the conveyer, a reciprocating operation in which the drive portion rotates the roll in the second direction in response to a leading end of the sheet reaching the first position and rotates the roll in the first direction in response to the leading end which reached the first position reaching the second position.

10 Claims, 16 Drawing Sheets

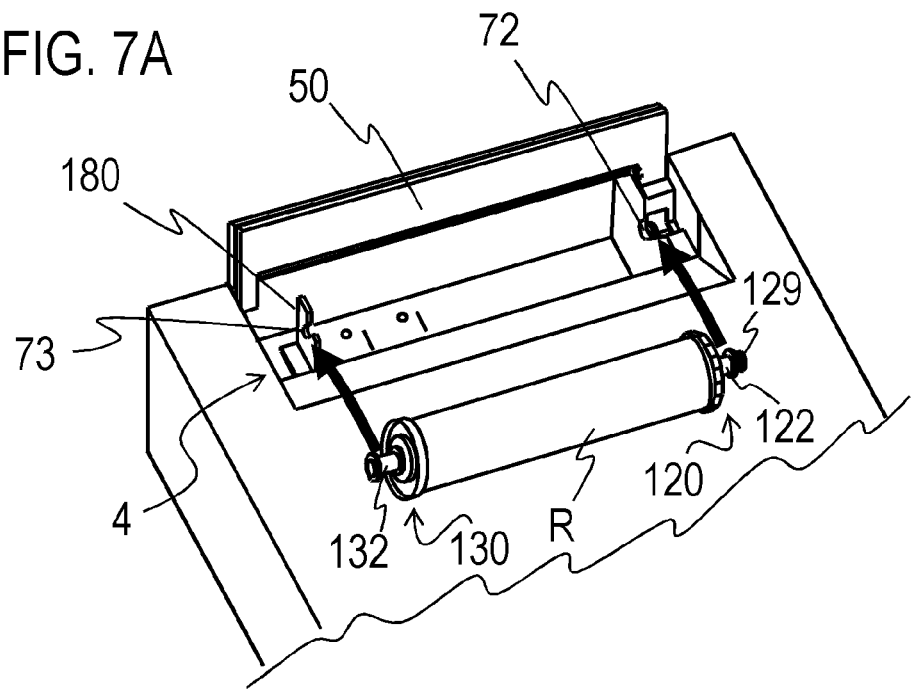
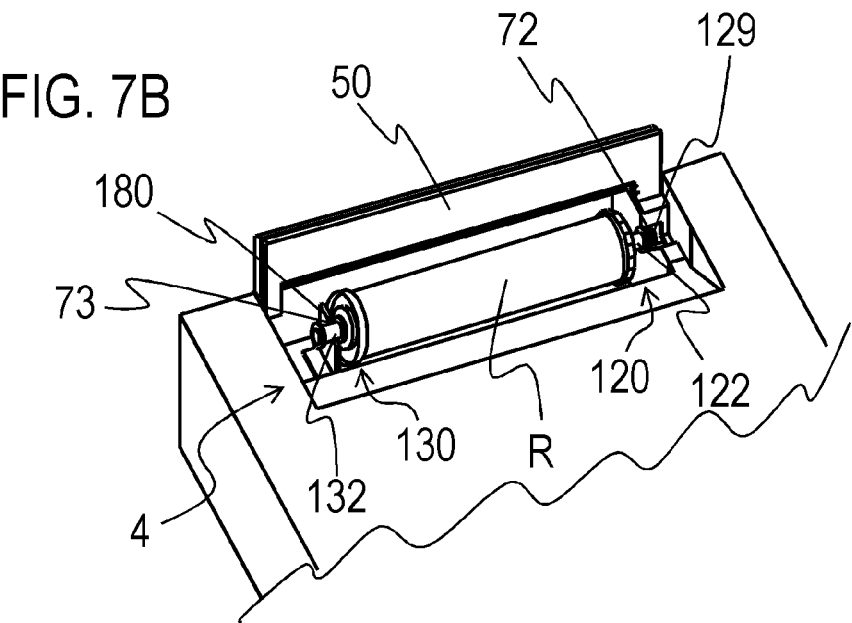

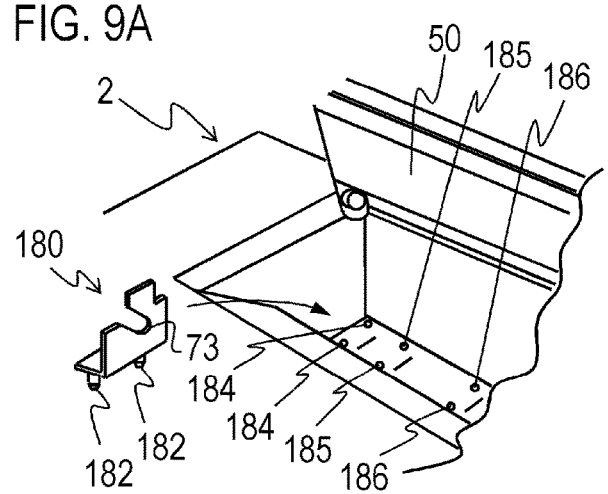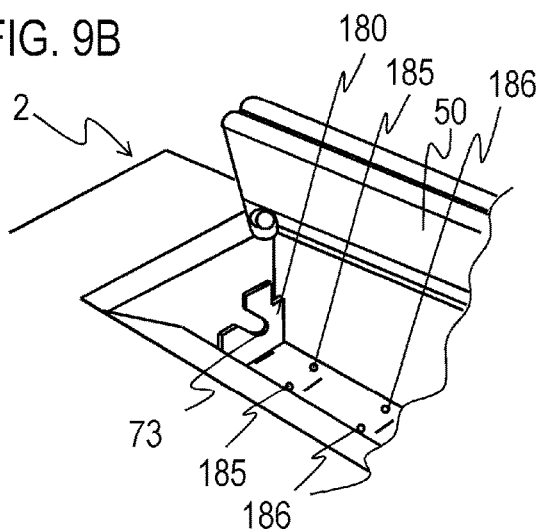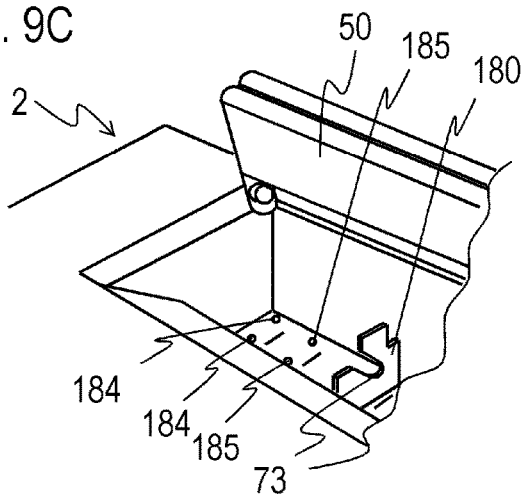

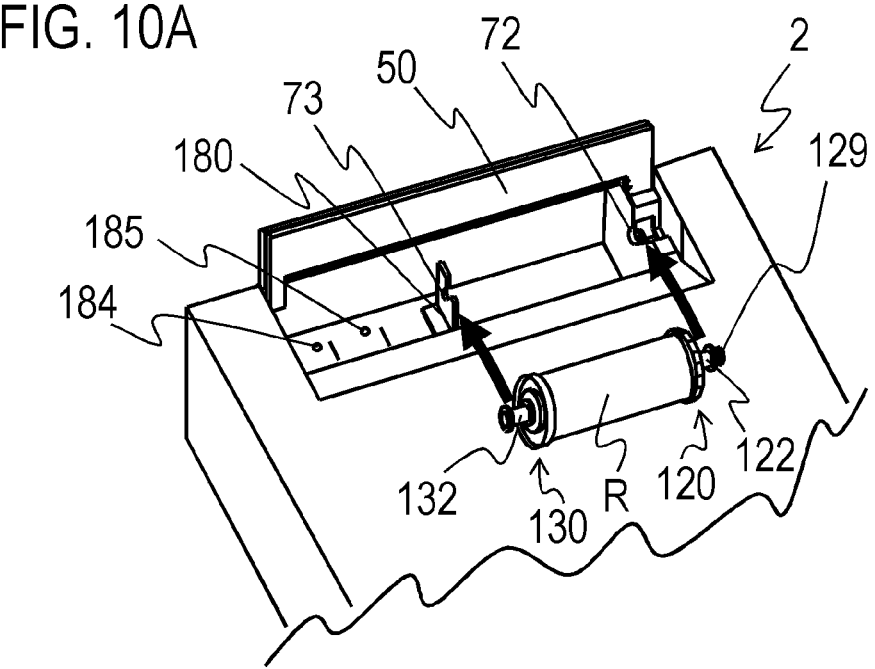
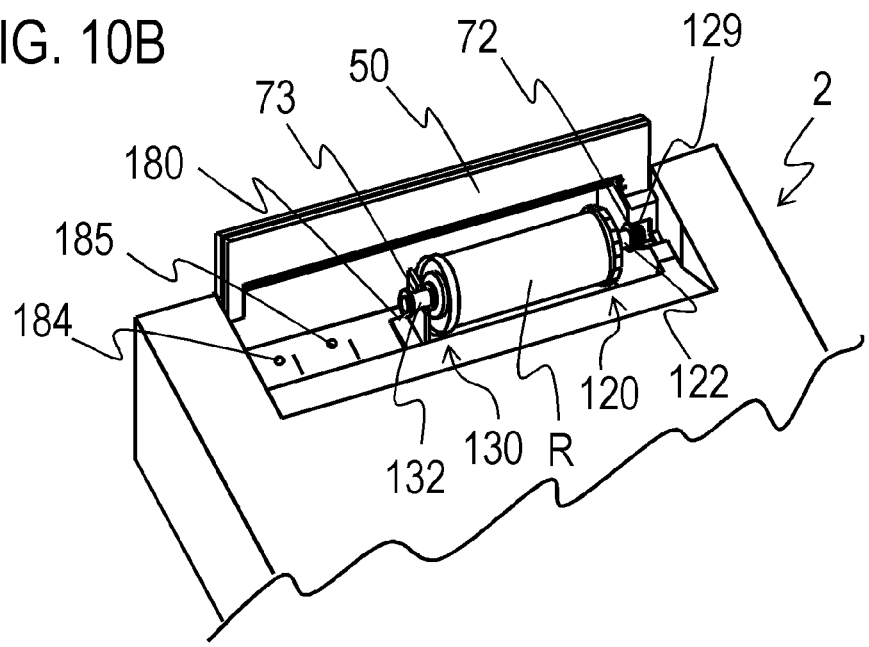

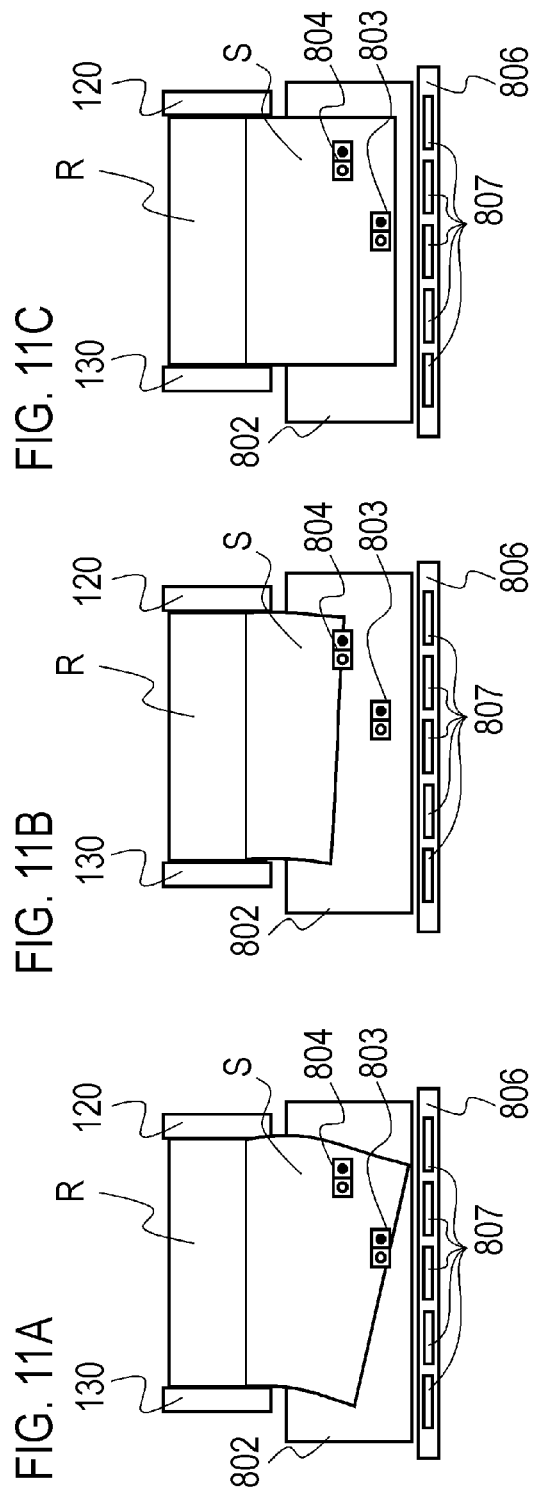

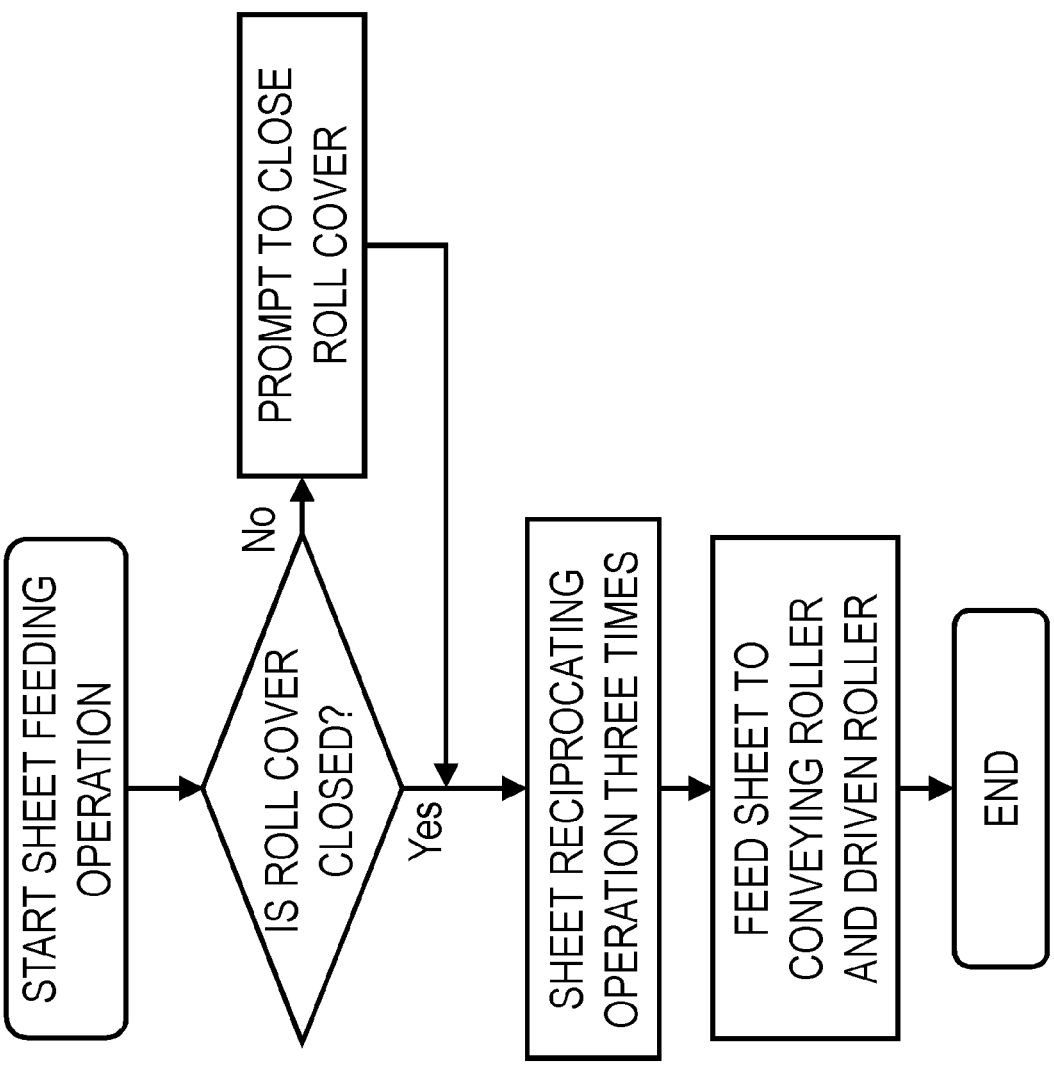
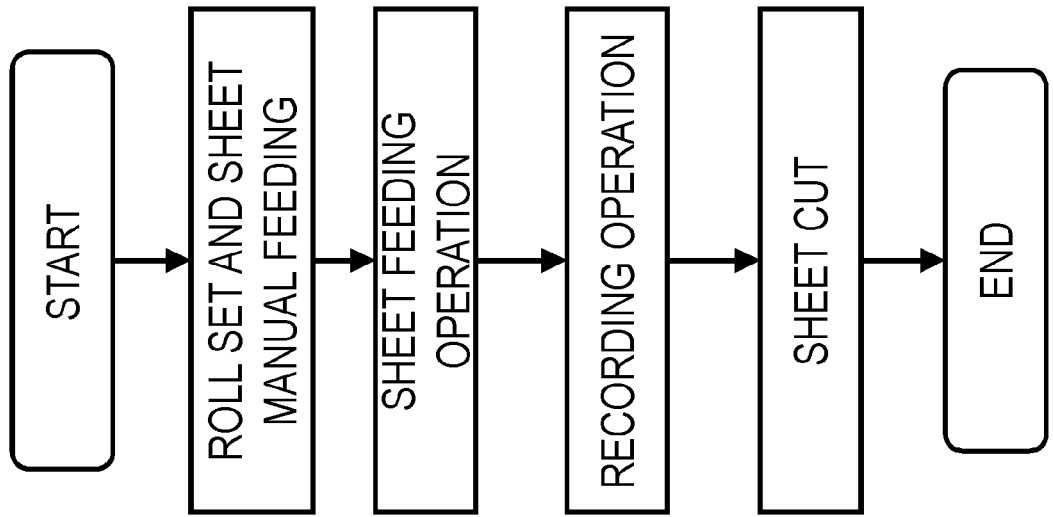

RECORDING APPARATUS AND PAPER FEEDING METHOD

BACKGROUND

Field

The present disclosure relates to a recording apparatus for performing recording on a sheet fed from a roll and a paper feeding method for a sheet.

Description of the Related Art

A recording apparatus is conventionally known that uses a sheet of recording paper, film, or the like rolled into a roll as a recording medium, and has a configuration that conveys the sheet to a recording portion using conveying means such as rollers. Such an apparatus is typically configured such that, to allow the sheet to be fed to the recording portion, the user manually inserts the leading end of the sheet to a given position within the recording apparatus after setting the roll in the recording apparatus.

When the sheet is manually fed, issues such as jamming and wrinkling of the sheet may occur depending on the degree of skew or slack of the sheet. Japanese Patent Application Laid-open No. 2021-143074 discloses a configuration in which the leading end of a sheet is brought into contact with a conveying roller for conveying the sheet to the recording portion so as to correct the orientation of the sheet.

However, in the above configuration, the leading end of the sheet may be damaged because the leading end of the sheet is brought into contact with the conveying roller when the sheet is fed. Also, when the leading end of the sheet is not parallel to the axial direction of the conveying roller, the orientation of the sheet cannot be corrected, so that proper feeding of the sheet is failed.

SUMMARY

Applicant's disclosed recording apparatus works towards improved sheet feeding performance.

According to an aspect of the present disclosure, a recording apparatus includes a support portion configured to rotatably support a roll around which a sheet is to be wound, a drive portion configured to rotate the roll supported by the support portion in a first direction to feed the sheet from the roll, and rotate the roll in a second direction that is opposite to the first direction to rewind the sheet onto the roll, a conveying passage configured to guide the sheet fed from the roll in a feeding direction, a conveyer disposed on a downstream side of the conveying passage in the feeding direction to convey the sheet, and a recording portion configured to record an image on the sheet conveyed by the conveyer, wherein the conveying passage has a first position upstream of the conveyer in the feeding direction and a second position upstream of the first position in the feeding direction, and wherein the drive portion is configured to perform, before the sheet reaches the conveyer, a reciprocating operation in which the drive portion rotates the roll in the second direction in response to a leading end of the sheet reaching the first position and rotates the roll in the first direction in response to the leading end which reached the first position reaching the second position.

According to the present disclosure, sheet feeding performance can be improved.

Further features of the present disclosure will become apparent from the following description of exemplary embodiments with reference to the attached drawings.

BRIEF DESCRIPTION OF THE DRAWINGS

FIGS. 7A and 7B are perspective views showing a roll support portion according to the first embodiment;

FIGS. 9A to 9C are perspective views showing a roll bearing on the non-reference side according to the first embodiment;

FIGS. 10A and 10B are perspective views showing the roll support portion supporting a narrow roll according to the first embodiment;

FIGS. 11A to 11C are top views showing reciprocating operation of a sheet according to the first embodiment;

FIGS. 12A and 12B are flowcharts showing operations of the recording apparatus according to the first embodiment;

DESCRIPTION OF THE EMBODIMENTS

Figure 1:
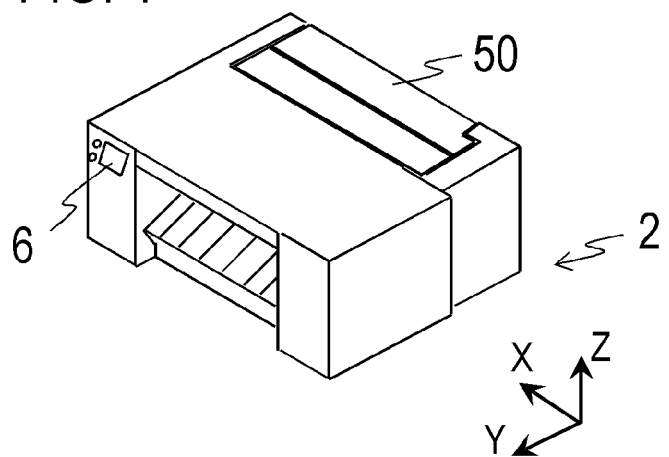
FIG. 1 is a perspective view of a recording apparatus according to a first embodiment.

Hereinafter, a description will be given, with reference to the drawings, of embodiments (examples) of the present disclosure. However, the sizes, materials, shapes, their relative arrangements, or the like of constituents described in the embodiments may be appropriately changed according to the configurations, various conditions, or the like of apparatuses to which the disclosure is applied. Therefore, the sizes, materials, shapes, their relative arrangements, or the like of the constituents described in the embodiments do not intend to limit the scope of the disclosure to the following embodiments.

First Embodiment

Referring to drawings, a recording apparatus 2 according to a first embodiment of the present disclosure is now described. The same reference numerals indicate the same or corresponding parts throughout the drawings.

Recording Apparatus 2

Referring to FIG. 1, the schematic configuration of the recording apparatus 2 is now described. FIG. 1 is a schematic perspective view showing the recording apparatus 2 according to the first embodiment to which the present disclosure is applied. As an application example of a recording apparatus, an inkjet recording apparatus is described that includes a sheet feeding apparatus for feeding a sheet as a recording medium and a printing portion for printing an image on the sheet. As used herein, the term "ink" serves as a general term for liquids such as recording liquid. Also, the term "sheet" in the present application refers to a recording medium, and its material is not limited to paper or plastic sheet.

As shown in FIG. 1, the exterior portion of the recording apparatus 2 includes an operation panel 6 with which the user can input various settings and commands and check information on the recording apparatus 2. The exterior portion of the recording apparatus 2 also includes a roll cover 50 for preventing dust and dirt from adhering to a roll R. Opening the roll cover 50 exposes a roll setting portion of the recording apparatus 2, allowing the roll R to be set in the recording apparatus 2. In the following description, as indicated in FIG. 1, a width direction of the roll supported by the recording apparatus 2 is defined as an X-axis direction, a horizontal direction intersecting the width direction is defined as a Y-axis direction, and the gravitational direction is defined as a Z-axis direction. In this embodiment, the X-axis direction, the Y-axis direction, and the Z-axis direction are orthogonal to each other.

Figure 2:
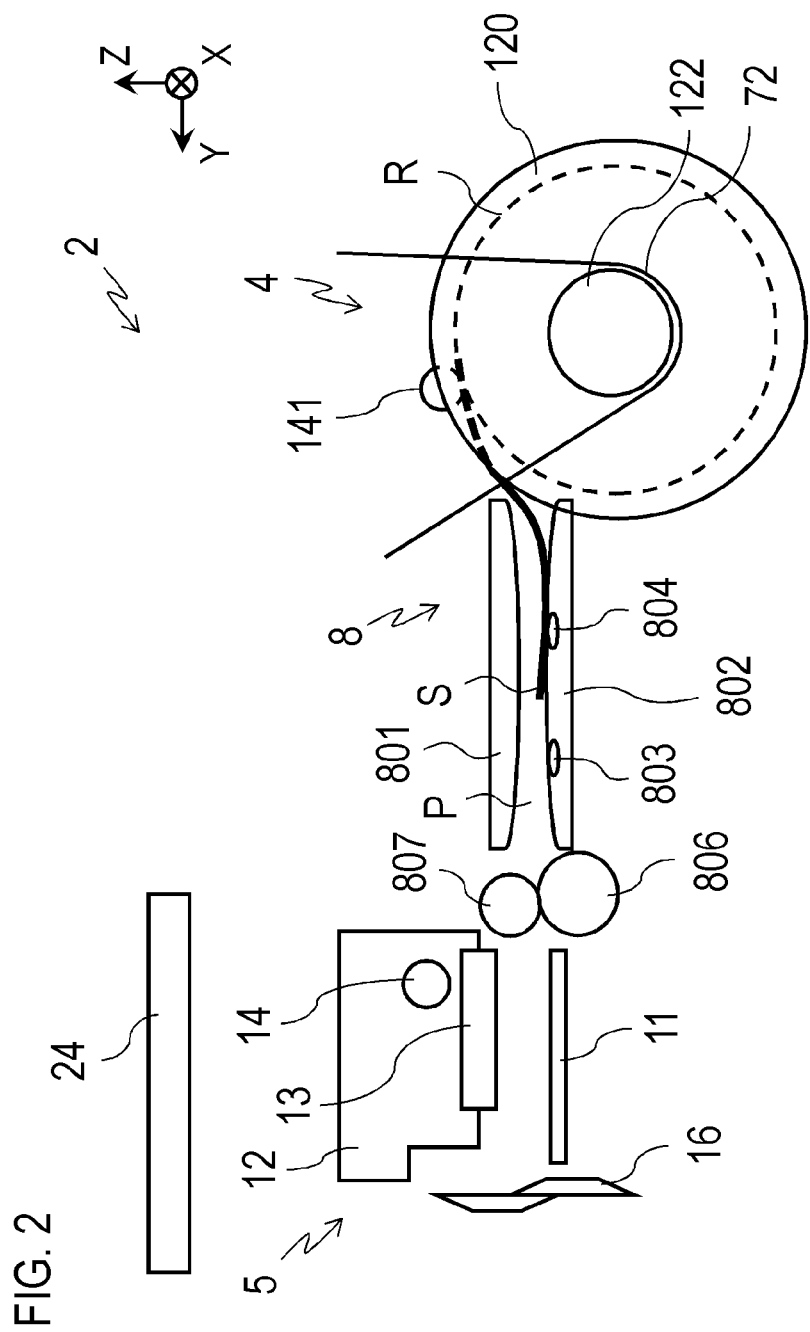
FIG. 2 is a cross-sectional view of the recording apparatus according to the first embodiment.
Figure 3:
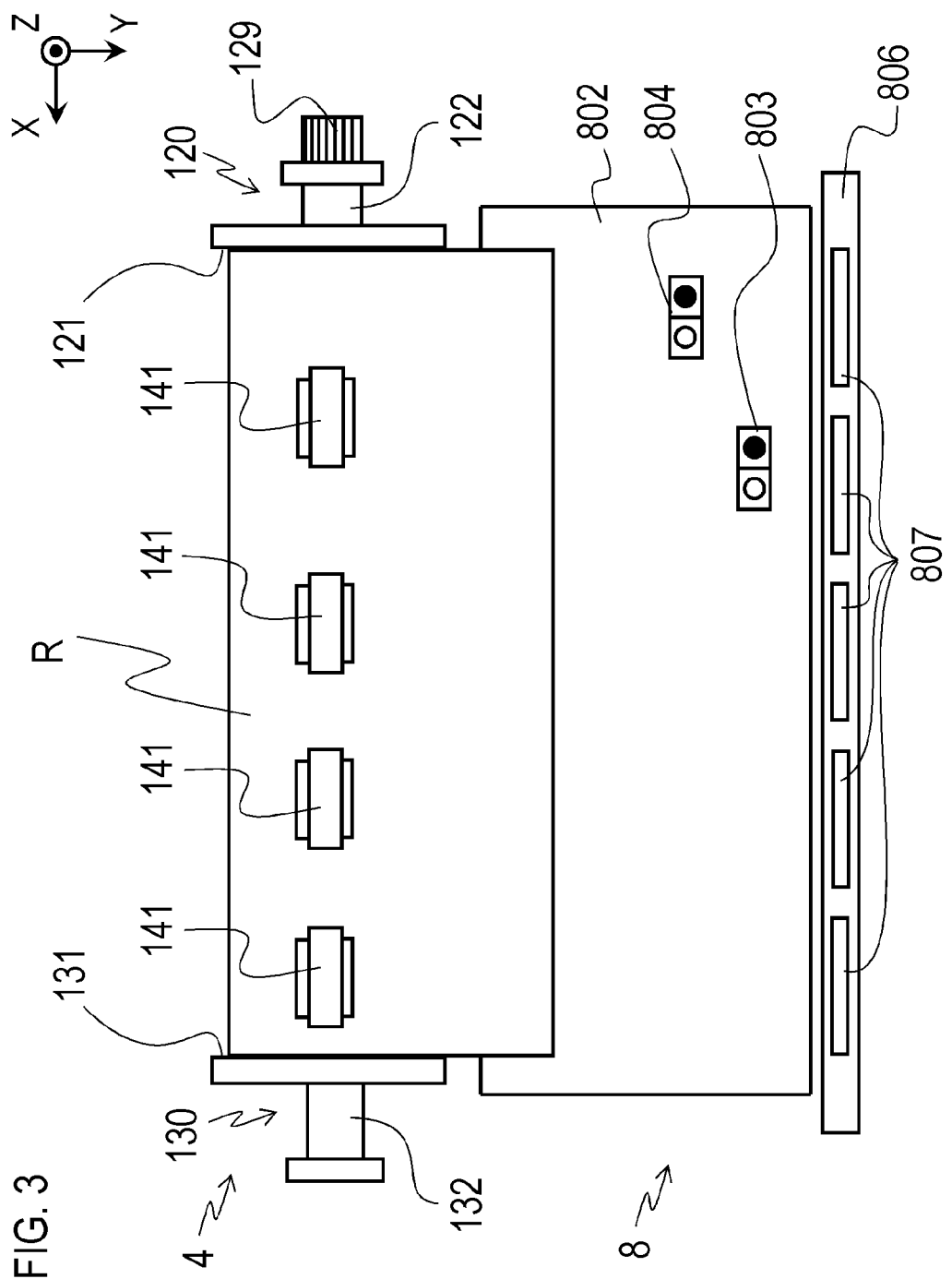
FIG. 3 is a top view of the recording apparatus according to the first embodiment.

Referring to FIGS. 2 and 3, a schematic configuration of the recording apparatus 2 is now described. FIG. 2 is a schematic cross-sectional view of the recording apparatus 2 according to the present embodiment as viewed in the width direction (X-axis direction) of the roll R. FIG. 3 is a schematic top view of a support portion 4 and a guide portion 8 as viewed in the gravitational direction (Z-axis direction). In FIGS. 2 and 3, illustration of some members is omitted to facilitate understanding of the configuration. The recording apparatus 2 of this embodiment can record an image on both the sheet S pulled out from the roll R and a piece of cut paper as recording media. When the sheet S is used as a recording medium, the roll R around which the sheet S is wound is rotatably supported by the support portion 4 as a roll set portion. The sheet S pulled out from the roll R supported by the support portion 4 is fed to the recording portion 5 while being guided by the guide portion 8. In this embodiment, the feeding direction of the sheet S from the support portion 4 to the recording portion 5 is substantially parallel to the Y-axis direction. A cutter 16 serving as a cutting portion for cutting the sheet S is provided on the downstream side of the recording portion 5 in the feeding direction of the sheet S.

As shown in FIG. 3, the support portion 4 includes a reference flange 120 and a non-reference flange 130, which support the roll R at both end portions in the width direction of the roll R. The roll R is arranged such that both end surfaces are held between a flange surface 121 of the reference flange 120 and a flange surface 131 of the non-reference flange 130 in the width direction. As viewed in the width direction of the roll R, the flange surfaces 121 and 131 are formed larger than the maximum roll diameter expected as the roll diameter of the roll R mounted on the recording apparatus 2. That is, the flange surfaces 121 and 131 function as restriction portions that restrict the position of the roll R in the width direction. The reference flange 120 is supported by a flange bearing 72 via a flange slide shaft 122, and the non-reference flange 130 is supported by a flange bearing 73 (see FIGS. 7A and 7B) via a flange slide shaft 132. This configuration allows the roll R to be supported by the recording apparatus 2 so as to be rotatable integrally with the reference flange 120 and the non-reference flange 130.

Also, the support portion 4 includes four pressing rollers 141 for pressing the roll R. The pressing rollers 141 are arranged in the width direction of the roll R on the roll cover 50, and the pressing rollers 141 presses the outer circumference surface of the roll R when the roll cover 50 is closed. Conversely, opening the roll cover 50 can separate the pressing rollers 141 from the roll R, facilitating the work performance in attaching and removing the roll R.

The guide portion 8 includes an upper guide 801 and a lower guide 802 forming a conveying passage P for guiding the sheet S. The upper guide 801 and the lower guide 802 extend in the feeding direction of the sheet S and face each other in the gravitational direction, thereby forming the upper and lower surfaces of the conveying passage P. In this embodiment, the upper and lower guides 801 and 802 are substantially parallel to the horizontal direction of the feeding direction of the sheet S. When the sheet S is fed while being guided by the guide portion 8 as the roll R rotates, the sheet S is fed along the lower guide 802 due to its own weight.

A first detection sensor 803 and a second detection sensor 804 are provided on the lower guide 802 as detection means for detecting the position of the leading end of the sheet S. The first detection sensor 803 and the second detection sensor 804 are a type of optical sensors, project light upward, and determine the presence or absence of the sheet S based on whether reflected light is received. When the sheet S is positioned above a sensor, the light is reflected on the sheet S, so that the presence of the sheet S is detected. In contrast, when the sheet S is absent, the absence of the sheet S is detected because the light is not reflected. The sensor for detecting the position of the sheet S is not limited to an optical sensor, and the position of the sheet S may be detected based on the amount of rotation of the roll R, for example.

A conveying roller 806 and a driven roller 807 as conveying means for conveying the sheet S to the recording portion 5 are provided downstream of the upper and lower guides 801 and 802 in the feeding direction of the sheet S and at the downstream end portion of the conveying passage P. When the leading end of the sheet S reaches the nip portion between the conveying roller 806 and the driven rollers 807, the conveying roller 806 is driven and rotated by a conveying motor 51 (see FIG. 4), so that the sheet S is held between the conveying roller 806 and the driven roller 807. As the conveying roller 806 is driven and rotated in this state, the sheet S is conveyed to the recording portion 5.

The present disclosure is characterized in that correction operation is performed to correct skew or slack of the sheet S in a method of feeding the sheet S after setting the roll R in the recording apparatus 2 and before the sheet S is held between the conveying roller 806 and the driven roller 807. Details of the method for feeding the sheet S and the correction operation will be described below.

The recording portion 5 includes a recording head 13 as an image recording means, a carriage 12, on which the recording head 13 is mounted, and a platen 11 facing the recording head 13. An upper cover 24, which can be opened and closed, is placed over the recording portion 5. The platen 11 guides and supports the back surface (the surface on the lower side in the gravitational direction) of the sheet S, on which recording is performed, to maintain a gap between the recording head 13 and the sheet S.

The carriage 12 is guided and supported along a carriage shaft 14 so as to be reciprocally movable in main scanning directions (±X directions). The carriage shaft 14 serves as a scanning guide extending in the width direction (X direction) of the roll R. Multiple discharge ports (nozzles) for discharging ink are arranged in the recording head 13 in the conveying direction of the sheet S (Y direction) in the recording portion 5. While the carriage 12 moves, ink is discharged from the multiple discharge ports toward the surface (the surface on the upper side with respect to the gravitational direction) of the sheet S on the platen 11 in accordance with the image data. After one line of image is recorded by discharge operation of the recording head 13 and movement of the carriage 12, the conveying roller 806 and the driven roller 807 convey the sheet S again by a predetermined pitch in the conveying direction, and the carriage 12 is moved again to record the next line of image. This is repeated to record an image over the entire page. The cutter 16 located downstream of the recording portion 5 in the conveying direction can cut the sheet S into a predetermined length. The image recording operation performed when a cut paper piece is used as a recording medium is the same as that for the sheet S, and the description is therefore omitted.

As described above, the recording apparatus of this embodiment is an inkjet recording apparatus of a serial type that performs recording by reciprocating the printing head in a direction intersecting the conveying direction of the recording medium. The recording head discharges ink onto the recording medium, which is intermittently conveyed. However, the recording apparatus to which the present disclosure is applied is not limited to the serial type inkjet recording apparatus. The present disclosure is also applicable to a line type inkjet recording apparatus that performs continuous printing using an elongated print head.

Figure 4:
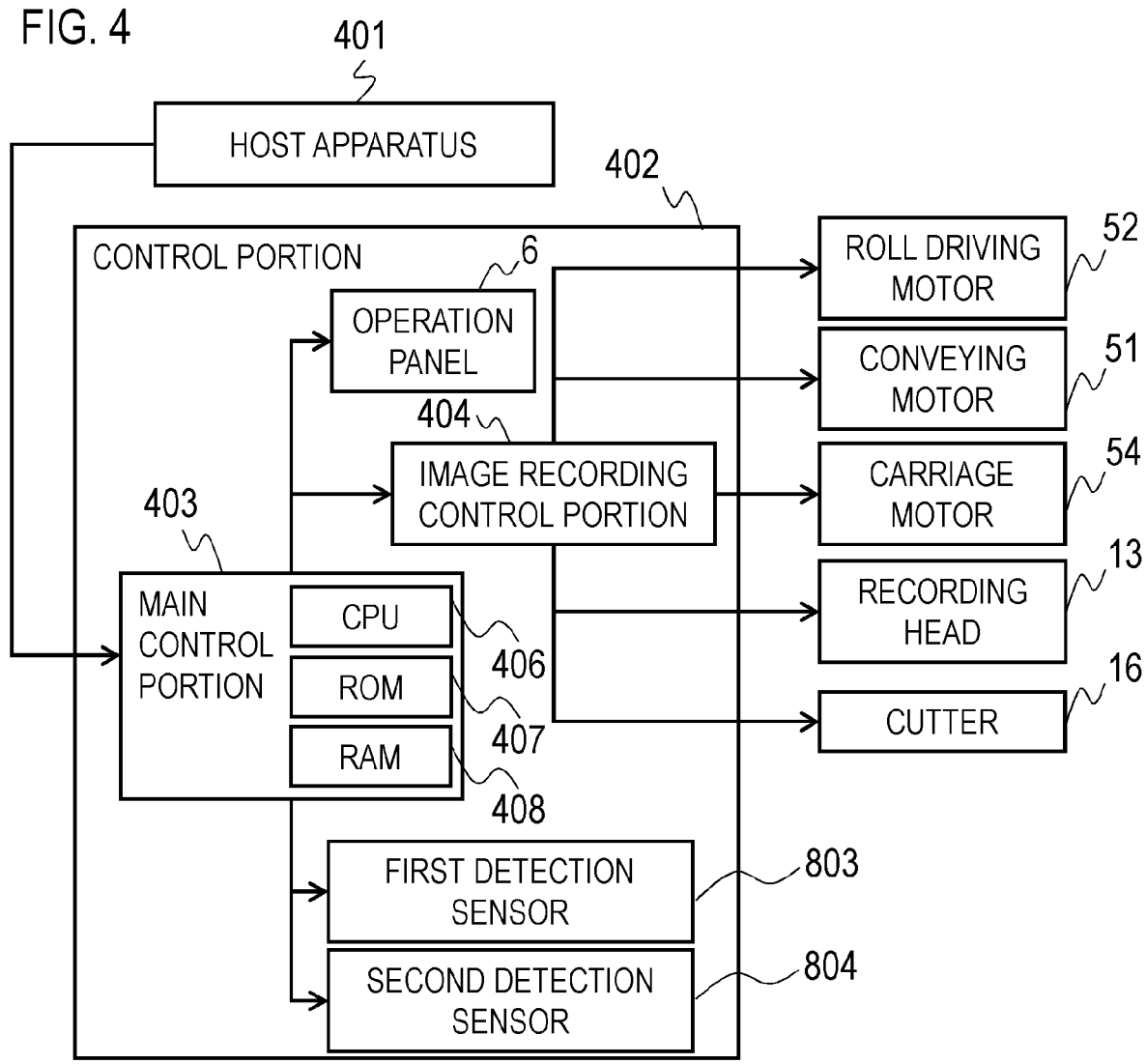
FIG. 4 is a schematic block diagram of the control configuration of the recording apparatus according to the first embodiment.

Referring to FIG. 4, an outline of the control configuration according to the present disclosure is now described. FIG. 4 is a schematic block diagram showing one embodiment of a control configuration according to the present disclosure.

A host apparatus 401 connected to the recording apparatus 2 transmits a recording command for an image created by the host apparatus 401 to a main control portion 403 of the recording apparatus 2. A control portion 402 mainly includes the main control portion 403 and an image recording control portion 404. The main control portion 403 includes a CPU 406, a ROM 407, and a RAM 408, which serve as calculation means. In the main control portion 403, the CPU 406 controls the entire recording apparatus 2 according to various programs and parameters stored in the ROM 407 while using the RAM 408 as a work area. Under the direction of the main control portion 403, the image recording control portion 404 controls the conveying motor 51, a roll driving motor 52, a carriage motor 54, the recording head 13, the cutter 16, and the like.

Method for Setting Roll R

Figure 5:
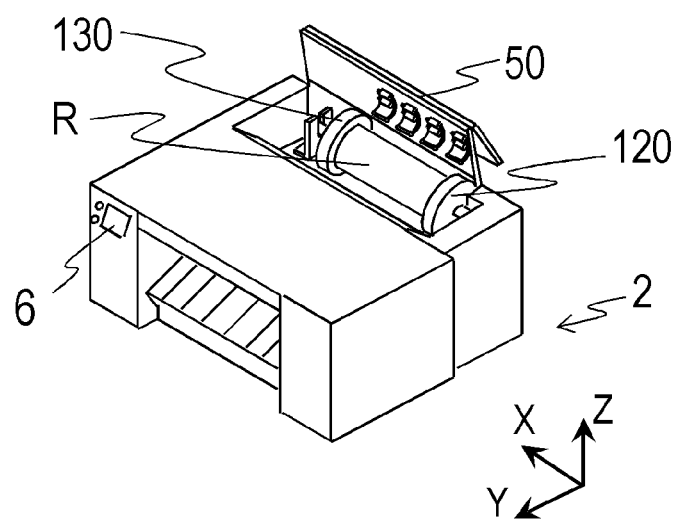
FIG. 5 is a perspective view of the recording apparatus according to the first embodiment with a roll cover opened.

A method for setting the roll R in the main body is now described in detail. FIG. 5 is a schematic perspective view of the recording apparatus 2 with the roll cover 50 opened. As described above, the roll R can be set in the recording apparatus 2 by opening the roll cover 50. The reference flange 120 and the non-reference flange 130, which are attachable and detachable flange members, are attached to both end portions of the roll R in the width direction, allowing the roll R to be set in the recording apparatus 2.

Figure 6A:
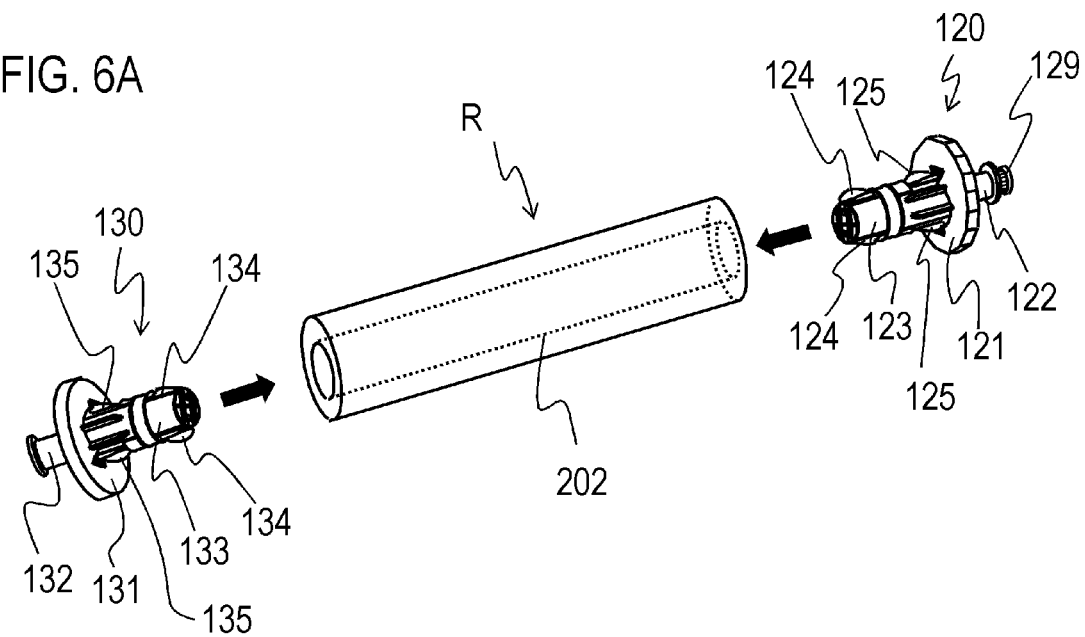
FIGS. 6A and 6B are perspective views of flanges and a roll according to the first embodiment.
Figure 6B:
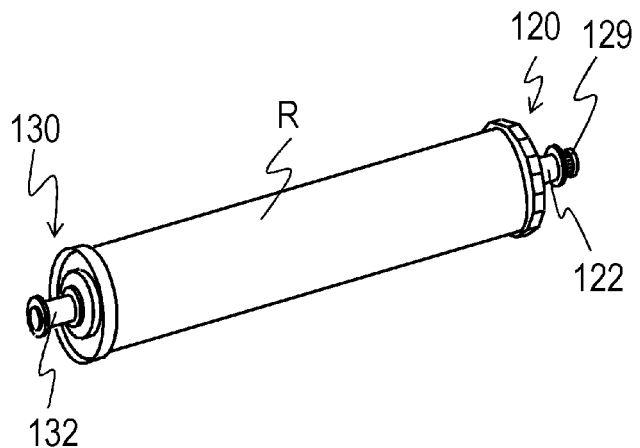

First, the configurations of the reference flange 120 and the non-reference flange 130 attached to both end portions of the roll R in the width direction are described in detail. FIG. 6A is a diagram illustrating a method for setting the reference flange 120 and the non-reference flange 130 on the roll R. FIG. 6B is a diagram showing a state in which the reference flange 120 and the non-reference flange 130 are set on the roll R.

The reference flange 120 includes a flat flange surface 121 facing the roll R, a flange core portion 123 projecting from the flange surface 121 in the direction of the roll R, and a flange slide shaft 122 projecting in the direction opposite to the flange core portion 123. The reference flange 120 also includes a flange gear 129 provided at the distal end of the flange slide shaft 122. First fitting portions 124 are provided on the distal end side of the flange core portion 123, which is farther from the flange surface 121. Second fitting portions 125 are provided on the proximal end side of the flange core portion 123, which is closer to the flange surface 121. When the reference flange 120 is attached to the roll R, the flange core portion 123 is inserted into a hollow hole 202 of the roll R, and the first fitting portions 124 and the second fitting portions 125 fit in the hollow hole 202.

The non-reference flange 130 has a curved flange surface 131 facing the roll R, a flange core portion 133 projecting from the flange surface 131 in the direction of the roll R, and a flange slide shaft 132. As with the reference flange 120, the non-reference flange 130 also includes first fitting portions 134 and second fitting portions 135, which fit in the hollow hole 202 of the roll R. When the non-reference flange 130 is attached to the roll R, the flange core portion 133 is inserted into the hollow hole 202 of the roll R, and the first fitting portions 134 and the second fitting portions 135 fit in the hollow hole 202.

Referring to FIGS. 7A and 7B, a method for setting the roll R, on which the reference flange 120 and the non-reference flange 130 are attached, in the recording apparatus 2 is now described. FIGS. 7A and 7B are perspective views of the support portion 4. FIG. 7A shows a state immediately before setting the roll R, on which the reference flange 120 and the non-reference flange 130 are attached, in the recording apparatus 2. FIG. 7B shows a state in which the roll R, on which the reference flange 120 and the non-reference flange 130 are attached, is set in the recording apparatus 2.

As shown in FIG. 7A, the flange slide shaft 122 of the reference flange 120 is set on the flange bearing 72, and the flange slide shaft 132 of the non-reference flange 130 is set on a flange bearing 73 of a non-reference bearing member 180. The user can set the roll R in the recording apparatus 2 by fitting the flange slide shaft 122 into the flange bearing 72 and fitting the flange slide shaft 132 into the flange bearing 73. In the configuration of the present embodiment, the positions of the bearings are always visible even when the shaft portions are close to the bearings. This facilitates attachment of the roll R. This is also evident in FIG. 7B, in which the flange bearings 72 and 73 are visible with the roll R set in the recording apparatus 2.

Figure 8:
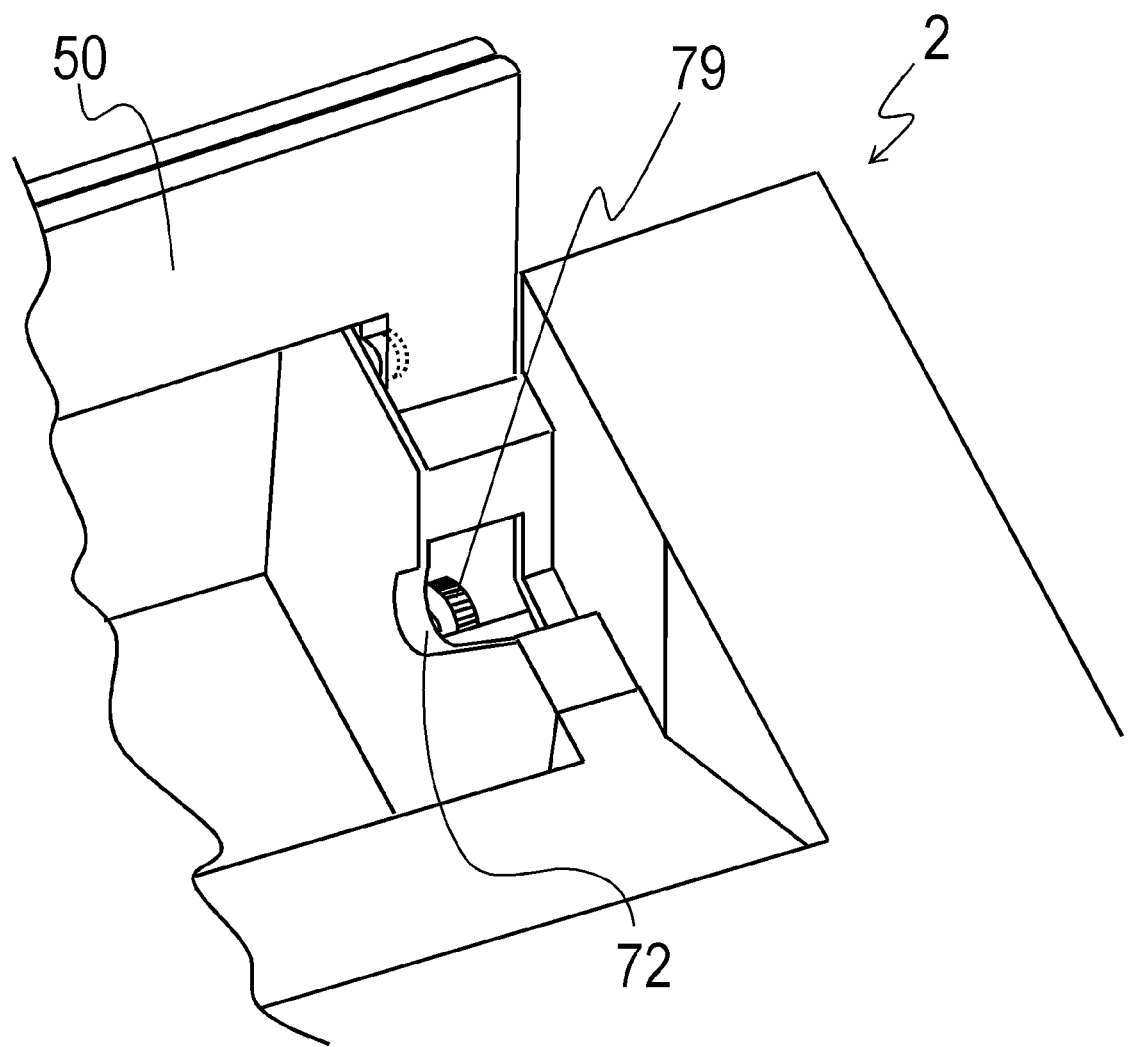
FIG. 8 is a perspective view showing a roll bearing on the reference side according to the first embodiment.

Referring to FIG. 8, the configuration of the reference side of the support portion 4, where the reference flange 120 is located, is first described. FIG. 8 is a perspective view showing a reference-side set portion, which supports the reference flange 120, of the support portion 4. When the reference flange 120 is set in the recording apparatus 2, the flange slide shaft 122 fits into the flange bearing 72 on the reference side. When the reference flange 120 is set in the recording apparatus 2 together with the roll R, the flange gear 129, which is supported by the reference flange 120 coaxially with the rotation axis of the roll R, meshes with a drive gear 79 connected to the roll driving motor 52. That is, the flange gear 129 of the reference flange 120 meshes with the drive gear 79 provided in the main body of the recording apparatus 2, allowing the roll R to be driven. The roll driving motor 52 transmits power to the flange gear 129 through the drive gear 79, so that the roll R and the non-reference flange 130 are driven and rotated in forward and reverse directions together with the reference flange 120. That is, the drive portion, formed by the roll driving motor 52, the drive gear 79, and the flange gear 129, rotates the roll R, allowing the sheet S to be moved forward and backward in the feeding direction.

Referring to FIGS. 9A to 9C, the configuration of the non-reference side of the support portion 4, where the non-reference flange 130 is positioned, and a method for setting the roll R when changing the width of the roll R to be set are now described. FIGS. 9A to 9C are perspective views showing a non-reference-side set portion, which supports the non-reference flange 130 of the support portion 4. FIG. 9A shows a state in which the non-reference bearing member 180, which supports the non-reference flange 130, is removed. FIG. 9B shows a state in which the non-reference bearing member 180 is attached at a position for setting a roll R with a wide paper width. FIG. 9C shows a state in which the non-reference bearing member 180 is attached at a position for setting a roll R with a narrow paper width.

The non-reference bearing member 180 is a component that supports the flange slide shaft 132 of the non-reference flange 130 when the roll R is set in the recording apparatus 2. The non-reference bearing member 180 includes a U-shaped flange bearing 73, into which the flange slide shaft 132 of the non-reference flange 130 can be fitted from the opening side of the flange bearing 73. The non-reference bearing member 180 also includes positioning portions 182 projecting downward from the bottom surface. Inserting the positioning portions 182 into positioning holes 184, 185, or 186 provided in the recording apparatus 2 places the non-reference bearing member 180 at a given position on the recording apparatus 2. The positions of the positioning holes may be determined according to the paper widths that are expected to be used with the recording apparatus 2. In FIGS. 9A to 9C, the positioning holes are provided at three locations in the width direction of the roll R so as to accommodate three types of paper widths, but the application of the present disclosure is not limited to this. The number and positions of the positioning holes may be modified.

In the present embodiment, of the positioning holes 184, 185, and 186, the positioning holes 184 are positioned to accommodate a roll R with the greatest width, followed by the positioning holes 185, and then the positioning holes 186. That is, in the width direction of the roll R, the positioning holes 184 are the closest to the non-reference side end portion, and the positioning holes 186 are the closest to the reference side end portion. As shown in FIG. 9B, when setting a roll R having the maximum paper width that can be set in the recording apparatus 2, the positioning portions 182 of the non-reference bearing member 180 are fitted into the positioning holes 184. In contrast, as shown in FIG. 9C, when setting a roll R having the minimum paper width that can be set in the recording apparatus 2, the positioning portions 182 of the non-reference bearing member 180 are fitted into the positioning holes 186. Fitting the positioning portions 182 into the positioning holes 185 is the same as fitting the positioning portions 182 into the positioning holes 184 or 186, and thus the description and illustration are omitted.

Referring to FIGS. 10A and 10B, a manner in which a roll R that is narrower than that shown in FIGS. 7A and 7B is set to the recording apparatus 2 is now described. FIGS. 10A and 10B are perspective views of the support portion 4 with the positioning portions 182 of the non-reference bearing member 180 fitted in the positioning holes 186. FIG. 10A shows a state in which the roll R, on which the reference flange 120 and the non-reference flange 130 are attached, is to be set to the recording apparatus 2. FIG. 10B shows a state in which the roll R, on which the reference flange 120 and the non-reference flange 130 are attached, is set in the recording apparatus 2.

As shown in FIG. 10A, in the same manner as in the setting of a roll R of a wide paper width, the flange slide shaft 122 of the reference flange 120 is set on the flange bearing 72, and the flange slide shaft 132 of the non-reference flange 130 is set on the flange bearing 73. As shown in FIG. 10B, the flange slide shaft 122 and the flange bearing 72 on the reference side are visible even after the roll R is set in the recording apparatus 2. Similarly, the flange slide shaft 132 and the flange bearing 73 on the non-reference side are also visible, and the bearings on both sides can be visually recognized during setting as with a roll R of a large paper width, allowing the roll R to be easily set into the recording apparatus 2. That is, the visibility of the bearings are satisfactory in the setting of a roll R with a narrow paper width, as well as the setting of a roll R of a wide paper width, thereby facilitating the attachment.

As described above, the position of the non-reference bearing member 180, which supports the non-reference flange 130, is variable, and the drive gear 79 is provided on the reference side where the position does not change regardless of the paper width. Accordingly, the configuration allows for the setting of rolls of different paper widths. One end portion of the roll R is fitted into the reference flange 120, and the roll R is set in the recording apparatus 2 while the reference-side end portion of the roll R is placed against the flat flange surface 121 on the reference side. The position of the roll R relative to the recording apparatus 2 is thus determined.

Feeding Operation of Sheet S

The paper feeding operation performed after the sheet S is pulled out from the roll R and before the sheet S is held between the conveying roller 806 and the driven roller 807 according to the present embodiment, which is a paper feeding operation characteristic of the present disclosure, is now described. With the roll R set in the recording apparatus 2, the user first manually moves the sheet S toward the downstream side of the guide portion 8 in the feeding direction in order to feed the sheet S. Since the user manually moves the sheet S, the sheet S may be in a skewed state or in a slack state lopsided to the left or right in the width direction. When the sheet S is fed to the nip portion between the conveying roller 806 and the driven roller 807 in such a state, the sheet S is held between the rollers in this state. This may cause paper wrinkling or jams. Also, if a skewed sheet S is corrected by bringing it into contact with the conveying roller 806 or the like, the sheet S may be damaged, correction may be failed when the leading end of the sheet S is not parallel to the axial direction of the conveying roller 806, or other issues may arise. Thus, the present embodiment performs, during the operation of feeding the sheet S, correction of skew or asymmetry caused by slack in the sheet S before the sheet S is held between the conveying roller 806 and the driven roller 807. The present disclosure is characterized in that the sheet S is corrected without being brought into contact with or held between the conveying roller 806 and the driven roller 807.

Referring to FIGS. 11A to 11C, the specific paper feeding operation and the correction method are now described. FIGS. 11A to 11C are schematic top views showing movement of the sheet S during feeding operation of the sheet S. After the roll R is set in the recording apparatus 2, the user first pulls out the sheet S from the roll R and manually inserts it into the conveying passage P of the guide portion 8. FIG. 11A shows a state in which the leading end of the sheet S has been automatically conveyed to the first detection sensor 803 by a forward rotation of the roll R caused by the roll driving motor 52 after the leading end is manually inserted to the position of the second detection sensor 804. FIG. 11B shows a state in which the roll R is rotated in the reverse direction after the state shown in FIG. 11A, returning the leading end of the sheet S to the second detection sensor 804. FIG. 11C shows a state in which the roll R is rotated in the forward direction after the state shown in FIG. 11B, conveying the leading end of the sheet S again to the first detection sensor 803. In the following description, the position at which the leading end of the sheet S reaches and is detected by the first detection sensor 803 is referred to as a first position, and the position at which the leading end reaches and is detected by the second detection sensor 804, which is upstream of the first position, is referred to as a second position.

In this embodiment, the guide portion 8 includes the first detection sensor 803 and the second detection sensor 804 located upstream of the first detection sensor 803 in the feeding direction of the sheet S, as described above. When the user manually moves the sheet S to the second position and the second detection sensor 804 detects that the leading end of the sheet S has reached the second detection sensor 804, a buzzer sounds to prompt the user to stop the manual feeding. After hearing the buzzer sound, the user closes the roll cover 50. When the roll cover 50 is closed, the multiple pressing rollers 141 press the outer circumference surface of the roll R, and the subsequent paper feeding operation is automatically performed.

The flange gear 129 of the reference flange 120 can drive and rotate the roll R. The drive portion rotates the roll R in the forward and reverse directions to move the sheet S in the conveying passage P of the guide portion 8. The user manually inserts the sheet S, and the second detection sensor 804 detects that the leading end of the sheet S has reached the second position. Then, after the roll cover 50 is closed, the roll R is rotated in the forward direction so that the sheet S is directed to the downstream side in the feeding direction.

Then, when the first detection sensor 803 detects that the leading end of the sheet S fed from the second position to the downstream side in the feeding direction has reached the first position, the drive portion stops rotating the roll R. At this time, if the sheet S manually inserted to the second position is skewed, the sheet S is fed to the first position in the skewed state as shown in FIG. 11A. If the sheet S is continuously fed in this state to the downstream side in its feeding direction, the sheet S would be held between the conveying roller 806 and the driven roller 807 in the skewed state. This may cause paper wrinkling or jams.

To correct the skew of the sheet S, the paper feeding operation of this embodiment includes the operation of conveying the sheet S to the upstream side in the feeding direction by rotating the roll R in the reverse direction after the sheet S reaches the first position. As shown in FIG. 11B, after conveyed to the first position, the sheet S is moved in the reserve direction along the guide portion 8 to the second position so that the leading end of the sheet S reaches the second detection sensor 804. At this time, the skewed sheet S is wound around the roll R whose outer circumference surface is pressed by the pressing roller 141, so that the skew is corrected. Also, in the winding operation of the sheet S, the sheet S is wound onto the roll R with both ends in the width direction of the sheet S in contact with the flange surface 121 of the reference flange 120 and the flange surface 131 of the non-reference flange 130. This is significantly effective in correcting the orientation of the sheet S.

The sheet S returned to the second position is then fed to the first position again. In the feeding operation of the sheet S, the recording apparatus 2 of the present embodiment is configured to repeat the reciprocating operation of moving the leading end of the sheet S from the first position to the second position and then moving it again to the first position three times, before the sheet S is held between the conveying roller 806 and the driven roller 807. By repeating such a reciprocating operation multiple times, skew or slack of the sheet S can be corrected more reliably.

As shown in FIG. 11C, after the sheet S is reciprocated multiple times between the first position and the second position and the skew of the sheet S is corrected, the roll R is rotated in the forward direction to feed the sheet S from the first position to the downstream side in the feeding direction. Then, when the leading end of the sheet S is held between the conveying roller 806 and the driven roller 807 positioned at the downstream end portion of the guide portion 8, the feeding operation of the sheet S is completed, allowing the sheet S to be conveyed to the recording portion 5. In the last reciprocating operation, the sheet S returned to the second position may be fed until the sheet S is held between the conveying roller 806 and the driven roller 807 without stopping at the first position.

FIGS. 12A and 12B are flowcharts of the process from setting of the roll R in the apparatus by the user to recording operation and sheet discharge. FIG. 12A is a flowchart showing a series of basic operations from roll setting to cutting of the printed sheet. FIG. 12B is a flowchart showing the sheet feeding operation in FIG. 12A. As shown in FIG. 12A, after the roll R is set in the recording apparatus 2, sheet feeding operation is performed, and then the recording portion 5 performs recording operation on the sheet S.

When completing manually feeding the sheet S, the user needs to close the roll cover 50 to start paper feeding operation. If the roll cover 50 is not closed after a certain period of time has passed since the manual feeding of the sheet S is completed, the operation panel 6 prompts the user to close the roll cover 50. After the roll cover 50 is closed, the reciprocating operation of the sheet S is performed a specified number of times, and the orientation of the sheet S is corrected before the sheet S reaches the conveying means to the recording portion 5. As shown in FIG. 12B, the reciprocating operation of the roll R is performed three times in the present embodiment, but the number does not have to be three in applications of the present disclosure. Since the orientation correction effect can be achieved when the number of forward and reverse rotations is at least one, the necessary and sufficient number of rotations may be performed taking into account the configurations of the conveying path, flanges, and the like. The number of reciprocating operations may be input by the user. After the specified number of reciprocating operations is completed, the sheet S is fed to the conveying roller 806 and the driven roller 807 serving as conveying means, and is held between the conveying roller 806 and the driven roller 807 to complete the paper feeding operation.

As described above, according to the present embodiment, since the reciprocating operation of the sheet S is performed before the sheet S reaches the conveying means, which conveys the sheet S to the recording portion 5, skew and slack of the sheet S can be corrected. Also, the present embodiment eliminates the need for bringing the sheet S into contact with the roller or the like to correct the sheet S, avoiding the risk of damage to the leading end of the sheet S, for example. Furthermore, skew of the sheet S can be corrected even when the leading end of the sheet S is cut manually, for example, and is shaped so as not to extend perpendicularly to the feeding direction.

Second Embodiment

Referring to FIGS. 13 to 15, 16A, and 16B, a second embodiment according to the present disclosure is now described. The second embodiment differs from the first embodiment in the shape of the guide portion. The following description focuses on the difference from the first embodiment. Same reference numerals are given to the other identical configurations, and the description thereof will be omitted.

Figure 13:
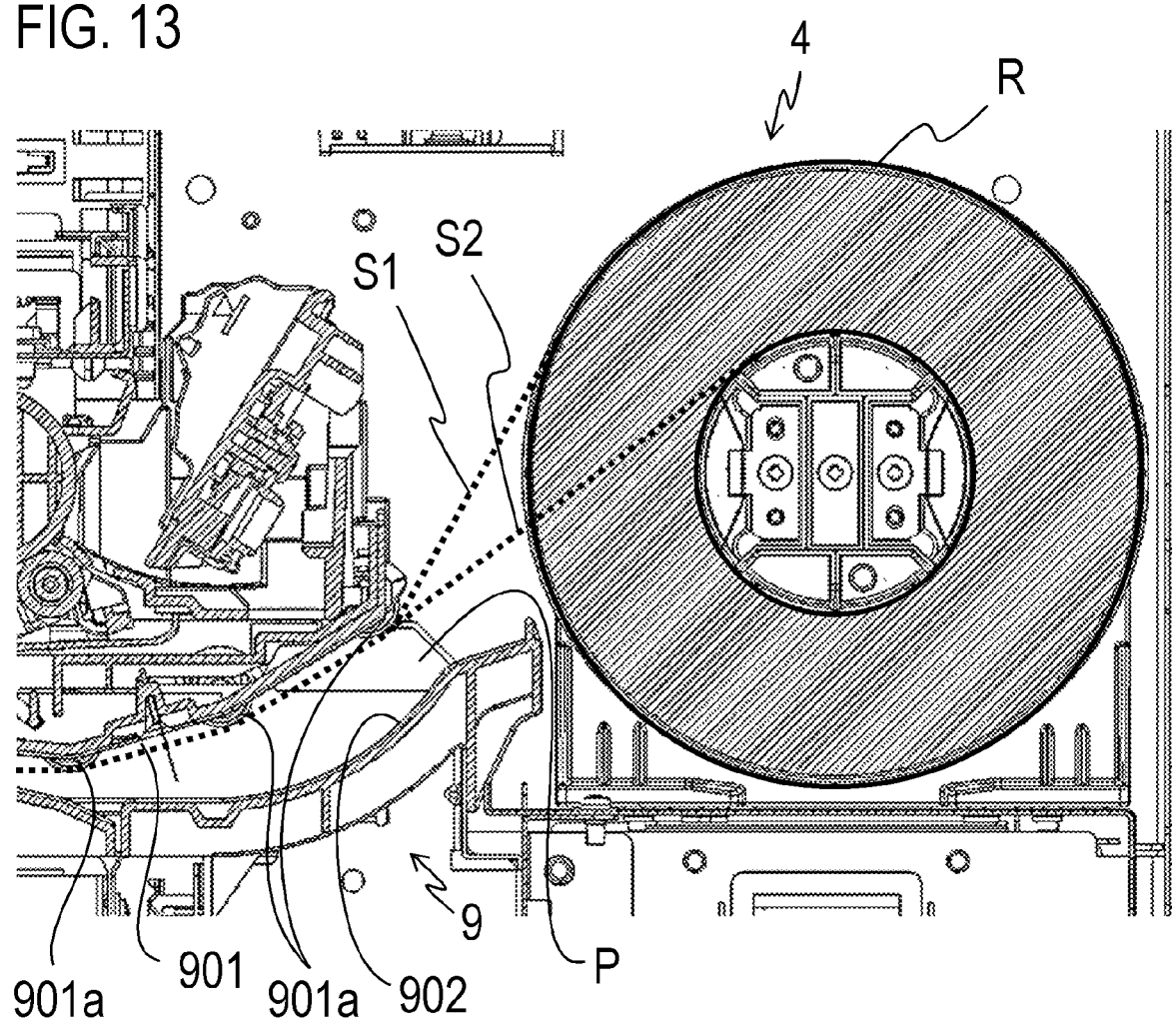
FIG. 13 is a schematic cross-sectional view showing a conveying passage according to a second embodiment.

The shape of the guide portion 9 according to the present embodiment and the procedure performed by the user to manually introduce the leading end of the sheet to the guide portion 9 are described in detail. FIG. 13 is a schematic cross-sectional view showing how the sheet S pulled out from the roll R is conveyed through the conveying passage P while being guided by the guide portion 9. The guide portion 9 includes an upper guide 901 and a lower guide 902 forming the conveying passage P for guiding the sheet S. The upper guide 901 and the lower guide 902 extend in the feeding direction of the sheet S and face each other in the gravitational direction, thereby forming the upper and lower surfaces of the conveying passage P. The inlet part of the conveying passage P of the guide portion 9 is positioned on the lower side of the rotation axis of the roll R in the gravitational direction. This is to increase the operating performance when the sheet S is inserted into the conveying passage P.

In FIG. 13, dotted line S1 indicates the path of the sheet S conveyed when the diameter of the roll R is large, and dotted line S2 indicates the path of the sheet S conveyed when the diameter of the roll R is small. In either case, when the sheet S is held between the conveying roller 806 and the driven roller 807, the sheet S is conveyed in slide contact with multiple guide rollers 901a provided on the upper guide 901.

Figure 14:
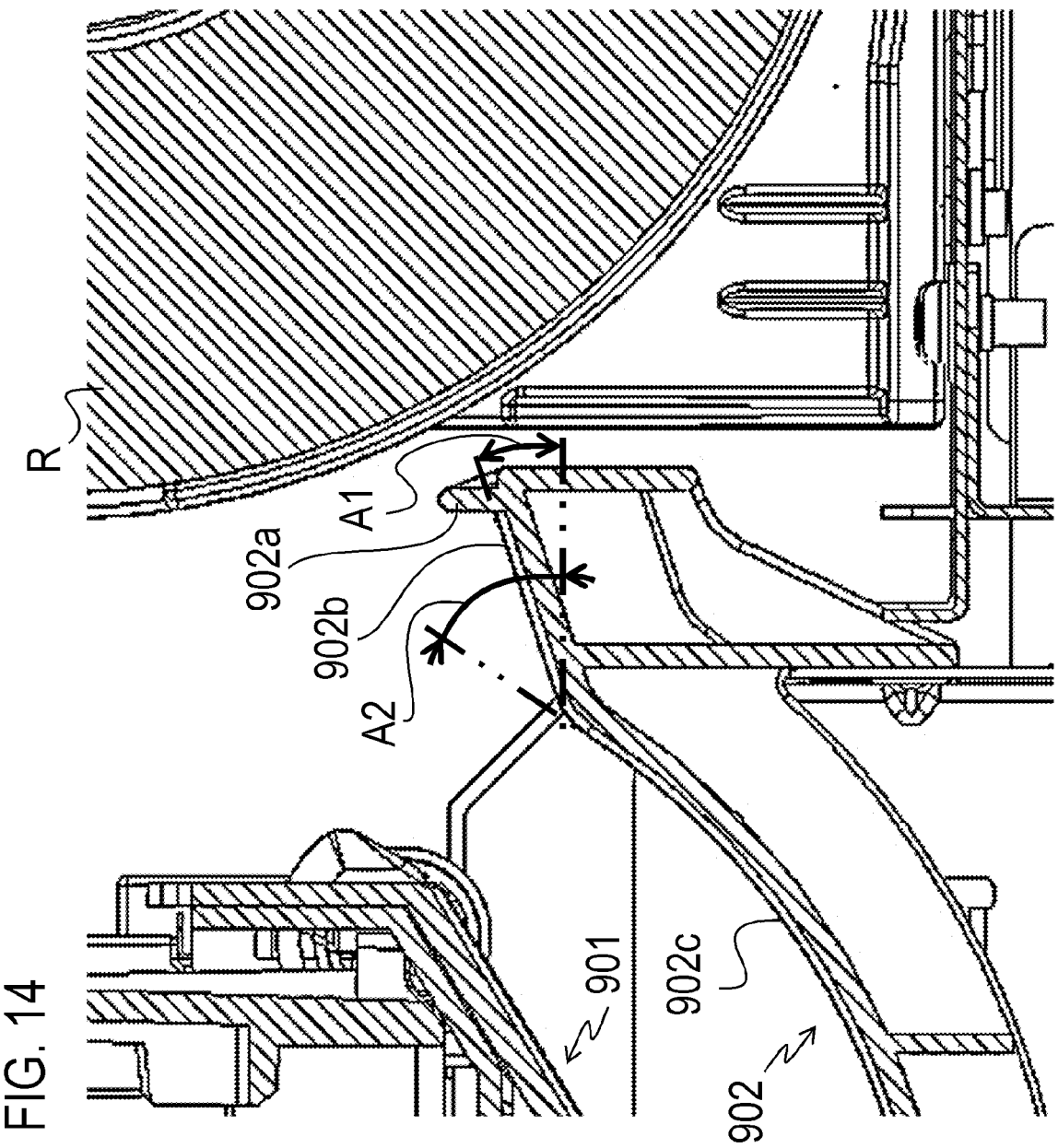
FIG. 14 is a schematic cross-sectional view showing an upstream end portion of a lower guide according to the second embodiment.
Figure 15:
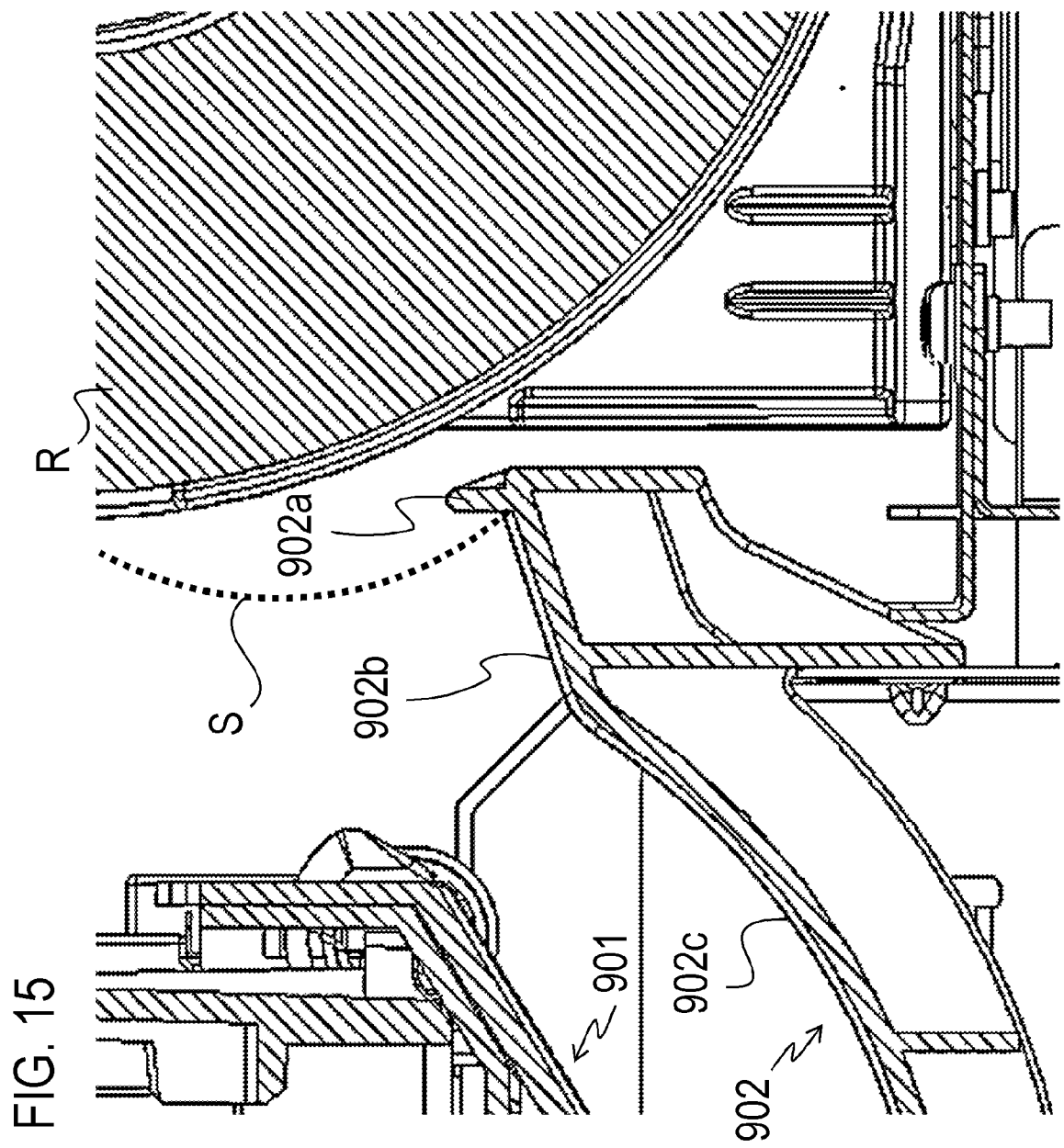
FIG. 15 is a schematic cross-sectional view showing the effect of a projection portion according to the second embodiment.

The shape of the lower guide 902, which is a characteristic feature of the present embodiment, is now described in detail. FIG. 14 is a diagram showing the upstream end portion of the guide portion 9 in the feeding direction of the sheet S. FIG. 15 is a diagram showing how the leading end of the sheet S is caught by a projection portion 902a of the lower guide 902 when the sheet S is inserted into the guide portion 9.

The lower guide 902 includes the projection portion 902a, which projects to the upper side with respect to the gravitational direction at the end portion on the upstream side in the feeding direction of the sheet S, a first guide portion 902b, which is located downstream of the projection portion 902a, and a second guide portion 902c, which is located downstream of the first guide portion 902b.

In this embodiment, as viewed in the width direction of the roll R, the projection portion 902a linearly extends upward with respect to the gravitational direction from the upstream end portion of the first guide portion 902b in the feeding direction of the sheet S. The first guide portion 902b also extends linearly and is formed to extend downward in the gravitational direction as it extends from the upstream side toward the downstream side in the feeding direction of the sheet S. In other words, the projection portion 902a is provided at the end portion of the lower guide 902 that corresponds to the roll R supported by the support portion 4, and extends upright from the first guide portion 902b.

With a configuration that does not include the projection portion 902a, the operation performance is poor because the sheet S tends to wind around the roll R again when its leading end is inserted into the guide portion 9, especially when the roll R has a small curl diameter and the sheet S is significantly curled. However, when the projection portion 902a is provided at the end portion on the insertion side of the lower guide 902 as shown in FIG. 15, the projection portion 902a catches the leading end of the sheet S, preventing the sheet S from winding around the roll R. That is, the present embodiment helps the user to manually insert the sheet S between the upper guide 901 and the lower guide 902 of the guide portion 9 smoothly, improving the operation performance in feeding the sheet S.

The projection portion 902a with a greater projection amount from the first guide portion 902b is more likely to prevent the sheet S from winding around the roll R. However, depending on the positional relationship between the guide portion 9 and the roll R, an excessive projection amount may cause the first guide portion 902b to interfere with the roll R. The shape and arrangement position of the projection portion 902a may be determined taking into account the maximum diameter of the roll R to be set in the recording apparatus 2, the positional relationship between the guide portion 9 and the roll R, and the like.

As viewed in the width direction of the roll R, the upstream end portion of the second guide portion 902c in the feeding direction of the sheet S is curved downward in a convex shape in the gravitational direction and extends downward in the gravitational direction as it extends from the upstream side toward the downstream side. In the present embodiment, the guide surface of the first guide portion 902b, which guides the sheet S, is inclined at an inclination angle A1 with respect to the horizontal plane. The guide surface of the second guide portion 902c, which guides the sheet S, is inclined at an inclination angle A2, which is larger than the inclination angle A1, near the portion connected with the first guide portion 902b. That is, the lower guide 902 is formed to transition from the second guide portion 902c to the first guide portion 902b so as to bend downward in the gravitational direction. In other words, the lower guide 902 is formed such that the conveying passage P opens toward the roll R as it extends from the second guide portion 902c to the first guide portion 902b. That is, the inlet part of the conveying passage is large, facilitating insertion of the sheet S.

Additionally, in the feeding direction of the sheet S, the first guide portion 902b of the lower guide 902 extends upstream of the upstream end of the upper guide 901. As described above, to feed the sheet S, after setting the roll R in the recording apparatus 2, the user needs to manually pull out the sheet S from the roll R and insert the sheet S to the first position in the conveying passage P. In the configuration of the present embodiment, the user can feed the sheet S along the lower guide 902 by rotating the roll R after placing the leading end of the sheet S on the first guide portion 902b. Since the first guide portion 902b is positioned upstream of the upper guide 901 in the feeding direction of the sheet S, the sheet S is less likely to interfere with the upper guide 901 when the sheet S is manually placed on the lower guide 902. This improves the operation performance in manually inserting the sheet S. The length and the inclination angle of the first guide portion 902b may be determined taking into account the maximum diameter of the roll R to be set in the recording apparatus 2, the positional relationship between the guide portion 9 and the roll R, and the like.

Figure 16A:
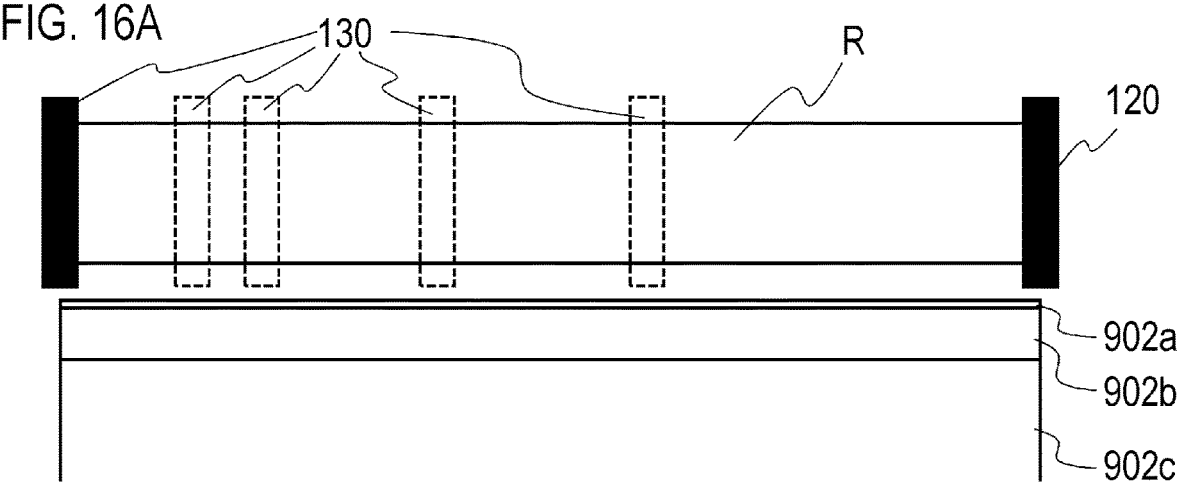
FIGS. 16A and 16B are schematic top views showing the upstream end portions of lower guides according to the second embodiment.
Figure 16B:
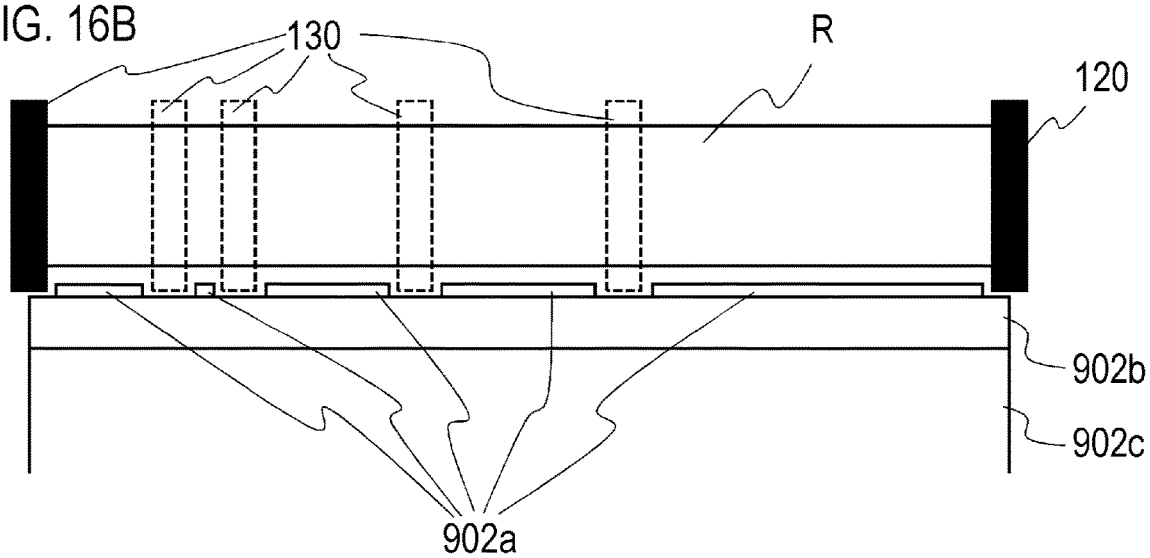

FIGS. 16A and 16B are diagrams of rolls R and lower guides 902 as viewed from above the apparatus. FIG. 16A shows the projection portion 902a of the present embodiment, while FIG. 16B shows projection portions 902a of a modification. In FIGS. 16A and 16B, dotted lines indicate the positions at which the non-reference flange 130 can be placed. In this embodiment, the projection portion 902a extends over substantially the entire region of the maximum width of the roll R that can be accommodated. However, when it is desired to bring the conveying passage P closer to the roll R, for example, projection portions 902a may be provided discontinually in the width direction of the roll R as with the modification shown in FIG. 16B to avoid interference of the projection portions 902a with the reference flange 120 and the non-reference flange 130.

A method for feeding the sheet S in this embodiment is now described in detail. As described above, the user sets the reference flange 120 and the non-reference flange 130 on the roll R and then sets them in the recording apparatus 2. Next, the user pulls out the sheet S from the roll R and manually inserts the sheet S into the recording apparatus 2. At this time, the user manually places the sheet S on the first guide portion 902b and then rotates the roll R in the direction in which the sheet S is fed. This advances the sheet S into the conveying passage P. When the sheet S reaches the first position, a buzzer sounds, and the user stops inserting the sheet S and closes the roll cover 50. Then, the recording apparatus 2 is automatically driven, starting a feeding operation of the sheet S. The subsequent paper feeding operation is the same as that in the first embodiment, and the sheet S is held between the conveying roller 806 and the driven roller 807 after the orientation of the sheet S is corrected by reciprocating the sheet S. As described above, the configuration of this embodiment can correct the orientation of the sheet S without bringing the sheet S into contact with the conveying roller 806, and improve the operation performance of manual feeding. That is, a jam or the like of the sheet S can be prevented, and the user's operation can be simplified, thereby improving the feeding performance of the sheet S.

Application of the present disclosure is not limited to the above-described embodiments. For example, the first embodiment includes two detection sensors for detecting the position of the leading end of the sheet S, but more detection sensors may be provided. A modification may be contemplated in which multiple detection sensors are provided in the width direction to detect the degree of skew of the sheet S, and the control portion may determine the number of reciprocating operations. As described above, various modifications are possible regarding the number of detection sensors, the positional relationship, the number of reciprocating operations of the sheet S, the movement position, and the like within the scope of the disclosure implemented in the above embodiment.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-083183, filed on May 20, 2022, which is hereby incorporated by reference herein in its entirety.

What is claimed is:

1. A recording apparatus comprising:
   a support mechanism configured to rotatably support a roll around which a sheet is to be wound;
   a driving mechanism configured to rotate the roll supported by the support mechanism in a first direction to feed the sheet from the roll, and rotate the roll in a second direction that is opposite to the first direction to rewind the sheet onto the roll;
   a conveying passage configured to guide the sheet fed from the roll supported by the support mechanism in a feeding direction;
   a conveyer disposed on a downstream side of the conveying passage in the feeding direction to convey the sheet;
   a recording head configured to record an image on the sheet conveyed by the conveyer; and
   a detector for detecting a position of a leading end of the roll,
   wherein the conveying passage has a first position upstream of the conveyer in the feeding direction and a second position upstream of the first position in the feeding direction,
   wherein the driving mechanism is configured to perform, before the sheet reaches the conveyer, a reciprocating operation in which the driving mechanism rotates the roll in the second direction in response to a to the leading end of the sheet reaching the first position and rotates the roll in the first direction in response to the leading end which reached the first position reaching the second position,
   wherein the detector is a plurality of optical sensors configured to project light and determine whether the sheet is at a corresponding position based on a presence or absence of reflected light, and wherein the plurality of optical sensors includes a first sensor located at a position corresponding to the first position and a second sensor located at a position corresponding to the second position.

2. The recording apparatus according to claim 1, wherein the driving mechanism is configured to repeat the reciprocating operation a plurality of times.

3. The recording apparatus according to claim 1, further comprising a flange facing both end surfaces of the roll in a width direction to restrict a position of the roll in the width direction.

4. The recording apparatus according to claim 3,
wherein the flange supports the roll from both ends in the width direction, and is attachable to and detachable from a main body of the recording apparatus.

5. The recording apparatus according to claim 1, further comprising a pressure roller assembly configured to press an outer circumference surface of the roll.

6. The recording apparatus according to claim 5, wherein the pressure roller assembly is a plurality of rollers arranged in a width direction of the roll.

7. The recording apparatus according to claim 1,
wherein the conveying passage has an upper surface and a lower surface that extend horizontally to form the conveying passage, and
wherein a projection portion is provided to project upward with respect to a gravitational direction from the lower surface at an end portion of the lower surface on an upstream side in the feeding direction.

8. The recording apparatus according to claim 7,
wherein the lower surface includes a first guide portion located downstream of the projection portion in the feeding direction and a second guide portion located downstream of the first guide portion in the feeding direction, and the lower surface transitions from the second guide portion to the first guide portion so as to bend downward in the gravitational direction, and
wherein the first guide portion extends upstream of an upstream end of the upper surface in the feeding direction.

9. A paper feeding method for a recording apparatus, wherein the recording apparatus includes a support mechanism configured to rotatably support a roll around which a sheet is to be wound, a driving mechanism configured to rotate the roll supported by the support mechanism in a first direction to feed the sheet from the roll, and rotate the roll in a second direction that is opposite to the first direction to rewind the sheet onto the roll, a conveying passage configured to guide the sheet fed from the roll in a feeding direction, a conveyer disposed on a downstream side of the conveying passage in the feeding direction to convey the sheet, and a recording head configured to record an image on the sheet conveyed by the conveyer, the paper feeding method comprising:

rotating, as a first rotating, the roll by the driving mechanism in the second direction in response to a leading end of the sheet reaching a first position in the conveying passage that has yet to reach the conveyer, and rotating the roll by the driving mechanism in the first direction in response to the leading end reaching a second position located upstream of the first position in the conveying passage after reaching the first position; and rotating, as a second rotating, the roll by the driving mechanism in the first direction so that the sheet reaches the conveyer, wherein the first rotating is repeated a plurality of times before the second rotating.

10. The paper feeding method according to claim 9, wherein the first rotating is started when a user manually feeds the leading end of the sheet to reach the first position.

* * * * *